(12) United States Patent
Fontanetta et al.

(10) Patent No.: US 10,043,015 B2
(45) Date of Patent: Aug. 7, 2018

(54) METHOD AND APPARATUS FOR APPLYING A CUSTOMER OWNED ENCRYPTION

(71) Applicant: AT&T Intellectual Property I, L.P., Atlanta, GA (US)

(72) Inventors: Amee Fontanetta, Cliffwood Beach, NJ (US); Roque Rios, Middletown, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 15 days.

(21) Appl. No.: 14/549,543

(22) Filed: Nov. 20, 2014

(65) Prior Publication Data

US 2016/0147999 A1 May 26, 2016

(51) Int. Cl.
| | |
|---|---|
| *G06F 17/30* | (2006.01) |
| *G06F 21/60* | (2013.01) |
| *G06Q 40/00* | (2012.01) |
| *G06Q 20/24* | (2012.01) |
| *G06F 21/62* | (2013.01) |
| *G06Q 20/14* | (2012.01) |
| *H04L 9/00* | (2006.01) |

(52) U.S. Cl.
CPC ........ *G06F 21/602* (2013.01); *G06F 21/6218* (2013.01); *G06Q 20/14* (2013.01); *G06Q 20/24* (2013.01); *G06Q 40/12* (2013.12)

(58) Field of Classification Search
CPC ... H04L 9/00; H04L 9/08; H04L 9/083; H04L 63/0428; H04L 63/0464; H04L 63/062; H04L 9/0894; G06F 17/30; G06F 21/62; G06F 21/10; H04N 7/167; F28F 13/02

USPC .................................. 713/165, 189, 171, 153
See application file for complete search history.

(56) References Cited

U.S. PATENT DOCUMENTS

| | | | |
|---|---|---|---|
| 5,109,413 A | 4/1992 | Comerford et al. | |
| 5,319,705 A | 6/1994 | Halter et al. | |
| 6,069,952 A | 5/2000 | Saito et al. | |
| 6,223,288 B1 * | 4/2001 | Byrne | G06F 21/121 380/255 |

(Continued)

FOREIGN PATENT DOCUMENTS

WO    WO 2006124652    11/2006

OTHER PUBLICATIONS

Zhou, Lan, Vijay Varadharajan, and Michael Hitchens. "Enforcing role-based access control for secure data storage in the cloud." The Computer Journal (2011).

(Continued)

*Primary Examiner* — Oluseye Iwarere
(74) *Attorney, Agent, or Firm* — Hanley, Flight & Zimmerman, LLC

(57) ABSTRACT

A method, computer-readable storage device and apparatus for customer owned encryption at a centralized storage server are disclosed. For example, the method receives a data file for storage and a customer owned encryption method from the customer, applies the customer owned encryption method to the data file at the centralized storage server to create a customer encrypted data file, deletes the customer owned encryption method from the centralized storage server and applies a general encryption method to the customer encrypted data file, wherein the general encryption method is applied to all data files stored in the centralized storage server.

20 Claims, 3 Drawing Sheets

(56) References Cited

U.S. PATENT DOCUMENTS

| | | | |
|---|---|---|---|
| 6,249,866 B1* | 6/2001 | Brundrett | G06F 12/1408 380/286 |
| 6,272,631 B1 | 8/2001 | Thomlinson et al. | |
| 6,665,709 B1* | 12/2003 | Barron | G06F 12/1408 707/999.005 |
| 6,683,954 B1 | 1/2004 | Searle | |
| 7,003,117 B2 | 2/2006 | Kacker et al. | |
| 7,260,215 B2 | 8/2007 | Troyansky et al. | |
| 7,418,737 B2* | 8/2008 | Grupe | H04L 63/0428 705/51 |
| 7,532,724 B2 | 5/2009 | Lee et al. | |
| 7,805,617 B2 | 9/2010 | Tagawa et al. | |
| 7,814,320 B2 | 10/2010 | Mackenzie et al. | |
| 8,024,810 B2 | 9/2011 | Saito | |
| 8,108,895 B2 | 1/2012 | Anderson et al. | |
| 8,275,850 B2 | 9/2012 | Kohan et al. | |
| 8,489,889 B1* | 7/2013 | Moscaritolo | G06F 21/604 379/93.02 |
| 8,613,105 B2* | 12/2013 | Shaikh | G06F 21/6272 726/28 |
| 8,625,802 B2 | 1/2014 | Parann-nissany | |
| 8,739,302 B2 | 5/2014 | Vainstein et al. | |
| 8,775,823 B2 | 7/2014 | Gokhale et al. | |
| 8,788,816 B1* | 7/2014 | Spaulding | G06F 21/10 713/165 |
| 8,862,902 B2 | 10/2014 | Hars et al. | |
| 8,966,287 B2* | 2/2015 | Bogorad | H04L 9/0822 380/282 |
| 9,262,760 B2* | 2/2016 | Carapelli | G06Q 20/382 |
| 9,560,019 B2* | 1/2017 | Barney | H04L 63/0428 |
| 2003/0101253 A1 | 5/2003 | Saito et al. | |
| 2003/0120926 A1* | 6/2003 | Fukushima | G11B 20/00086 713/176 |
| 2003/0140257 A1* | 7/2003 | Peterka | F28F 13/02 726/12 |
| 2004/0091114 A1* | 5/2004 | Carter | G06F 21/606 380/259 |
| 2004/0139024 A1* | 7/2004 | So | G06Q 20/401 705/51 |
| 2004/0260921 A1 | 12/2004 | Treadwell | |
| 2005/0091487 A1* | 4/2005 | Cross | G06F 21/10 713/165 |
| 2006/0067529 A1* | 3/2006 | Kojima | G11B 20/00086 380/201 |
| 2007/0100913 A1* | 5/2007 | Sumner | G06F 11/1453 |
| 2007/0113078 A1* | 5/2007 | Witt | G06F 21/602 713/165 |
| 2007/0219816 A1* | 9/2007 | Van Luchene | G06Q 10/06 705/80 |
| 2009/0300351 A1* | 12/2009 | Lei | G06F 17/30864 713/165 |
| 2011/0225428 A1 | 9/2011 | Stufflebeam et al. | |
| 2012/0207301 A1* | 8/2012 | Ramasamy | H04L 9/0637 380/44 |
| 2013/0080772 A1* | 3/2013 | McGowan | H04L 63/0428 713/165 |
| 2013/0219176 A1* | 8/2013 | Akella | H04L 63/0815 713/165 |
| 2013/0254537 A1* | 9/2013 | Bogorad | H04L 9/0822 713/165 |
| 2013/0254558 A1* | 9/2013 | Bogorad | H04L 9/30 713/193 |
| 2013/0305057 A1* | 11/2013 | Greco | G06F 21/80 713/189 |
| 2014/0013112 A1* | 1/2014 | Cidon | G06F 21/6218 713/165 |
| 2014/0164774 A1* | 6/2014 | Nord | G06F 21/602 713/171 |
| 2014/0270178 A1 | 9/2014 | Kiang et al. | |
| 2014/0281545 A1* | 9/2014 | Erofeev | G06F 21/6218 713/171 |
| 2014/0310513 A1* | 10/2014 | Barney | H04L 63/0428 713/153 |
| 2014/0331062 A1* | 11/2014 | Tewari | G06F 21/6227 713/189 |
| 2015/0156174 A1* | 6/2015 | Fahey | H04L 63/0428 713/168 |

OTHER PUBLICATIONS

Wang, Guojun, Qin Liu, and Jie Wu. "Hierarchical attribute-based encryption for fine-grained access control in cloud storage services." Proceedings of the 17$^{th}$ ACM conference on Computer and communications security.

Yan, Liang, Chunming Rong, and Gansen Zhao. "Strengthen cloud computing security with federal identity management using hierarchical identity-based cryptography." Cloud Computing. Springer Berlin Heidelberg, 2009. 167-177.

López-Alt, Adriana, Eran Tromer, and Vinod Vaikuntanathan. "On-the-fly multiparty computation on the cloud via multikey fully homomorphic encryption." Proceedings of the forty-fourth annual ACM symposium on Theory of computing. ACM, 2012.

Tebaa, Maha, Saïd El Hajji, and Abdellatif El Ghazi. "Homomorphic encryption applied the cloud computing security." Proceedings of the World Congress on Engineering. vol. 1. 2012.

\* cited by examiner

METHOD AND APPARATUS FOR APPLYING A CUSTOMER OWNED ENCRYPTION

The present disclosure relates generally to a method and apparatus for applying an encryption to protect data, and more specifically, for applying a customer owned encryption to protect customer data.

BACKGROUND

Currently, data security is becoming a big area of concern for service providers, retailers and customers. For example, many large retailers or online network storage service providers store a large amount of personal and/or sensitive data of various different customers. However, recently hackers have been able to breach the encryption used by these retailers and service providers to access the personal information of their customers.

One problem is that these retailers or service providers apply a single encryption on all of the data received from their customers. As a result, if a hacker is able to break the encryption used by the retailers or service providers, then the hacker may obtain access to all of the data that is stored by the retailers or service providers. Thus, using a single encryption method on all of the data files may not provide enough data security.

SUMMARY

In one embodiment, the present disclosure provides a method, computer-readable storage device and apparatus for customer owned encryption at a centralized storage server. In one embodiment, the method receives a data file for storage and a customer owned encryption method from the customer, applies the customer owned encryption method to the data file at the centralized storage server to create a customer encrypted data file, deletes the customer owned encryption method from the centralized storage server and applies a general encryption method to the customer encrypted data file, wherein the general encryption method is applied to all data files stored in the centralized storage server.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to encryption and, more particularly, to a method, computer-readable storage device and apparatus for applying a customer owned encryption. As discussed above, data security is becoming a big area of concern for service providers, retailers and customers. One problem is that these retailers or service providers apply a single encryption on all of the data received from their customers. As a result, if a hacker is able to break the encryption used by the retailers or service providers, then the hacker may obtain access to all of the data that is stored by the retailers or service providers. Thus, using a single encryption method on all of the data files may not provide enough data security.

One embodiment of the present disclosure allows each customer to create his or her own encryption method to be applied to the centrally stored data file. Then the service provider's encryption method is applied to the data file that is already encrypted with the encryption method selected by the customer.

In one embodiment, any records or information regarding the encryption method used by the customer is deleted from the service provider's records in the centralized storage server. As a result, even if a hacker is successful in hacking the service provider's general encryption method, the hacker would still have to hack each customer's unique encryption method. Thus, the time required for a hacker to hack each data file would be exponentially increased.

Figure 1:
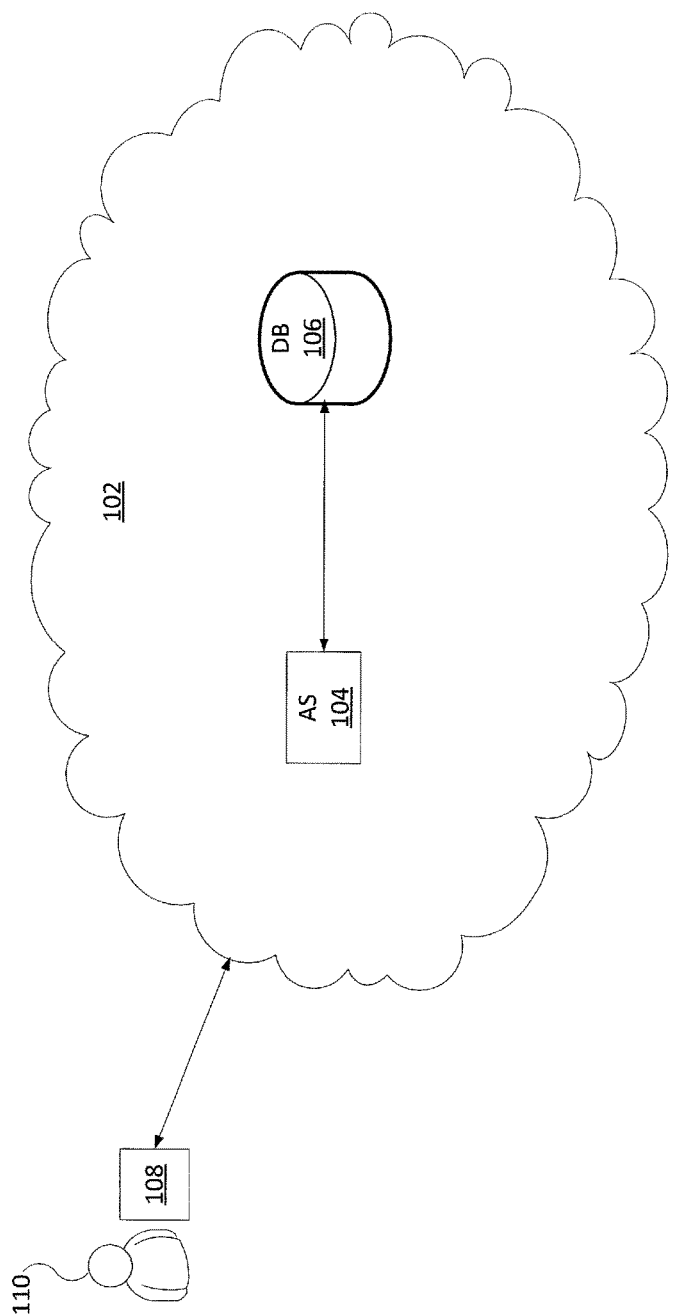
FIG. 1 illustrates one example of a communications network of the present disclosure.

FIG. 1 illustrates an example communication network 100 of the present disclosure. In one embodiment, the communication network 100 may include a network 102. In one embodiment, the network 102 may be an Internet Protocol (IP) based communication network maintained and operated by a service provider. For example, the service provider may be a retailer that stores credit card information for future purchases or recurring billing in the database (DB) 106. The service provider may also be a cloud storage service provider that stores data files for customers in the cloud. In one embodiment, the service provider may also be a telecommunication service provider or core network service provider that provides cellular service, voice service, data service, multimedia service, and the like.

In one embodiment, the network 102 may include an application server (AS) 104 and a database (DB) 106 (also referred to as a centralized storage server). In one embodiment, the DB 106 may store various data files of one or more customers. For example, the DB 106 may store personal information, billing information and credit card information of the customers, pictures, videos, documents, music, and the like (referred to collectively as data files). In one embodiment, the AS 104 may be deployed as a computer illustrated in FIG. 3 and described below and may perform the operations discussed herein.

Although FIG. 1 illustrates the network 102 only having a single AS 104 and a single DB 106, it should be noted that any number of application servers and databases may be deployed. In addition, it should be noted that network 102 may include additional network elements not shown, such as for example, border elements, gateways, routers, switches, firewalls, one or more access networks, and the like.

In one embodiment, a customer 110 may use the network 102 to store a data file, e.g., a text file, an image file, a video file, and so on. In one embodiment, the customer 110 may use an endpoint device 108 to generate or obtain a customer owned encryption method. In one embodiment, the endpoint device 108 may be any type of endpoint device including a smart phone, a tablet computer, a laptop computer, a desktop computer, a pair of computing glasses, and the like. In one embodiment, the endpoint device 108 may communicate with the network 102 via either a wired connection or a wireless connection.

In one embodiment, the endpoint device 108 may have an encryption creator application that may generate the customer owned encryption method for the customer 110 or the customer 110 may use the endpoint device 108 to program his or her own customer owned encryption method. The customer owned encryption method may be any type of encryption including, a cipher method encryption, a hash function, shifting each alphanumeric character by one position, and the like. In one embodiment, the customer owned encryption method may only be stored locally on the endpoint device 108. As a result, the endpoint device 108 may serve as a hardware lock for the customer owned encryption method that is created or generated by the customer 110.

In one embodiment, the customer owned encryption method that is created by the customer 110 via the endpoint device 108 may then be sent to the network 102 with the data file that is to be stored in the centralized storage server or DB 106. In one embodiment, the service provider may apply the customer owned encryption method to the data file to create a customer encrypted data file that is stored in the DB 106.

Subsequently, the customer owned encryption method is deleted from the centralized storage server or DB 106. In other words, any trace of the customer owned encryption method is removed from any storage device or memory in the entire network 102. Said another way, once the customer owned encryption method is deleted, the service provider has no record of the customer owned encryption method. As a result, the only way to decrypt the customer encrypted data file would be to request the customer to send the customer owned encryption method again.

The customer encrypted data file may then be encrypted with a "general" encryption method that is applied to all data files stored in the centralized storage server or DB 106. The term "general" simply means that the encryption method is applied to all customers' data files by the service provider. For example, the general encryption method may be a secure hash algorithm (SHA) (e.g., SHA-2 encryption).

As a result, the DB 106 may include data files for a plurality of different customers. However, each customer may encrypt his or her own data file with a unique customer owned encryption method. As a result, even if a hacker were able to hack the general encryption method used by the service provider on all the data files, the hacker would only gain access to the customer encrypted data files. However, since there is no record of the customer owned encryption method in the network 102, the hacker would then be required to hack each customer's data file or files separately. This would increase the time required to hack each data file exponentially.

In one embodiment, when the data file needs to be accessed by the customer or by the service provider (e.g., for a recurring or repeat billing), the customer may send the service provider the customer owned encryption method. For example, the customer may want to retrieve the data file and send a request to the service provider. The request may include the customer owned encryption method which allows the service provider to determine a corresponding customer owned decryption method. Said another way, by knowing the encryption algorithm that is used by the customer owned encryption method, the service provider will now be able to decrypt the customer encrypted data file.

The service provider may then first decrypt the general encryption method applied to the customer encrypted data file. Said another way, the service provider will apply a "general" decryption method that is complementary to the "general" encryption method that is applied to all data files stored in the centralized storage server or DB 106. Next, the service provider will then decrypt the customer owned encryption method that was applied to the data file. The data file may then be sent back to the customer.

In another embodiment, the service provider may send the customer a request to access the data file. This may also serve to provide the customer a reminder or a notification that a recurring billing charge is about to take place (e.g., for a subscription service). The notification may provide an additional benefit of reminding the customer 110 about an automatic subscription renewal that the customer had forgotten about. The customer 110 may then decline the subscription renewal. Alternatively, the customer may provide permission to the service provider to bill the account of the customer 110 and send the customer owned encryption method to the service provider so that the service provider may service the customer's account, e.g., generating a bill and so on.

For example, the service provider may decrypt the general encryption method applied to the customer encrypted data file. The service provider may then decrypt the customer owned encryption method applied to the data file. The service provider may then access the data file. Once the service provider obtains the necessary information, the data file will be again encrypted with the customer owned encryption method and the general encryption method. The customer owned encryption method is again deleted from the network 102, as discussed above, once the customer owned encryption method is applied.

Figure 2:
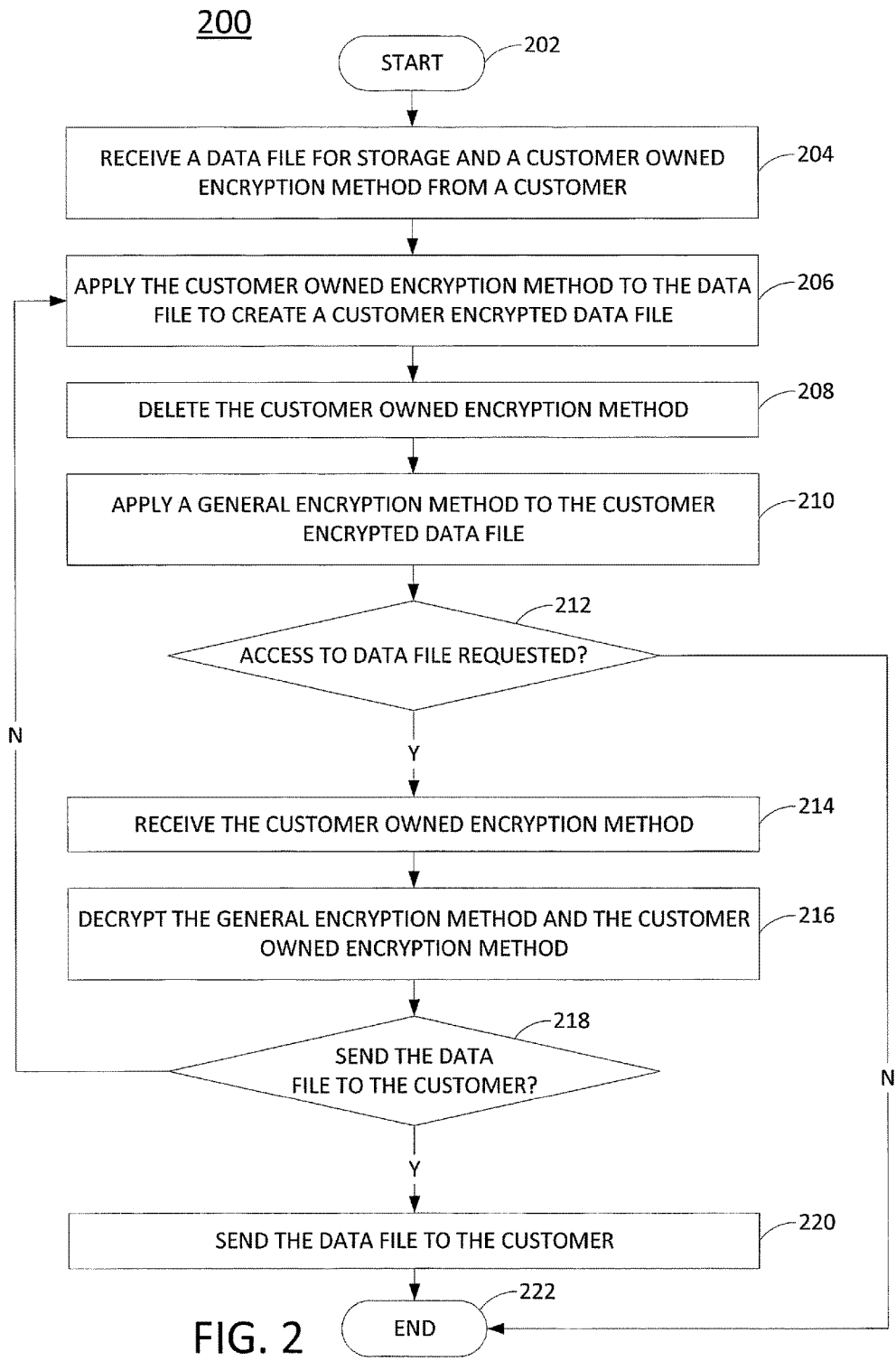
FIG. 2 illustrates an example flowchart of a method for customer owned encryption at a centralized storage server.
Figure 3:
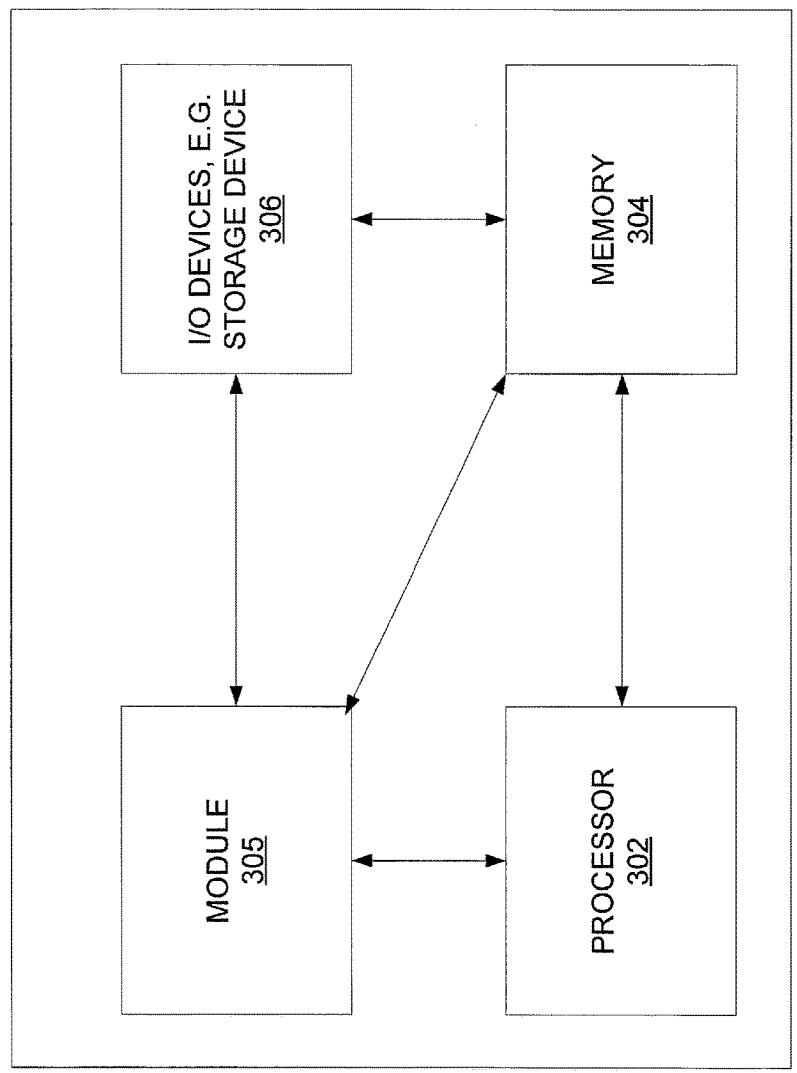
FIG. 3 illustrates a high-level block diagram of a computer suitable for use in performing the functions described herein.

FIG. 2 illustrates a flowchart of a method 200 for applying a customer owned encryption. In one embodiment, the method 200 may be performed by the AS 104 or a dedicated computer as illustrated in FIG. 3 and discussed below.

The method 200 begins at step 202. At step 204, the method 200 receives a data file for storage and a customer owned encryption method from a customer. For example, the customer may want to store data files such as pictures, videos, documents, and the like in the centralize storage server of a cloud storage service provider. In another embodiment, the customer may purchase a product or service from a retailer online and the retailer may store the customer's billing information and credit card information in the centralized storage server for future purchases or recurring billing of a subscription.

At step 206, the method 200 applies the customer owned encryption method to the data file to create a customer encrypted data file. In one embodiment, the customer may create a unique customer owned encryption method on his or her endpoint device. The customer owned encryption method may be sent to the service provider with the data file such that the service provider may apply the customer owned encryption method to the data file. In one embodiment, the customer owned encryption method may be any type of encryption including, a cipher method encryption, a hash function, an encryption method that shifts each alphanumeric character by one position, and the like.

At step 208, the method 200 deletes the customer owned encryption method. For example, any trace of the customer owned encryption method is removed from any storage device or memory in the entire network. Said another way, once the customer owned encryption method is deleted, the service provider has no record of the customer owned encryption method. As a result, the only way to decrypt the customer encrypted data file would be to request the customer to send the customer owned encryption method again which broadly includes sending a complementary decryption method.

At step 210, the method 200 applies a general encryption method to the customer encrypted data file. For example, the general encryption method used to encrypt all data files of all customers stored at the centralized storage server is applied to the customer encrypted data file. In other words, decryption of the general encryption method would only result in allowing access to another encrypted file, e.g., the customer encrypted data file.

At step 212, the method 200 determines if access to the data file is requested. For example, the customer may send a request to the centralized storage server to access the data file or the service provider may need to access the data file, e.g., to apply a monthly billing charge using information (e.g., a credit card number) in the data file.

If access to the data file is not requested, the method 200 may proceed to step 222. However, if access to the data file is requested, the method 200 may proceed to step 214.

At step 214, the method 200 receives the customer owned encryption method which broadly includes receiving a complementary decryption method. For example, the customer may send the customer owned encryption method with a request to obtain the data file or in response to a request from the service provider to access the data file.

At step 216, the method 200 decrypts the general encryption method and the customer owned encryption method. For example, the general encryption method may be decrypted and then the customer encrypted data file may be decrypted with the customer owned encryption method. Said another way, complementary decryption methods will be applied.

At step 218, the method 200 determines if the data file should be sent to the customer. For example, if the customer requested access to the data file, the data file should be sent to the customer. However, if the service provider needs to access the data file, the data file does not need to be sent to the customer.

If the data file does not need to be sent to the customer, the method 200 may return to step 206 and repeat steps 206-218. For example, after the service provider accesses the data file, the data file is encrypted again using the customer owned encryption method to create the customer encrypted data file. The customer owned encryption method is then deleted from the centralized storage server and the customer owned encryption method is then encrypted with the general encryption method.

However, if the data file does need to be encrypted, the method 200 may proceed to step 220. At step 220, the method 200 sends the data file to the customer. At step 222, the method 200 ends.

It should be noted that the embodiments of the present disclosure improve the technology of data storage security by providing an additional layer of encryption. As a result, even if the generally encryption method is hacked, the hacker only has access to customer encrypted data files. Since each customer has a different encryption method the hacker would be required to additional hack each customer's unique encryption method again.

It should be noted that although not explicitly specified, one or more steps or operation of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for applying a customer owned encryption, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for applying a customer owned encryption (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for applying a customer owned encryption (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for applying customer specific encryption methods at a centralized storage server, the method comprising:
   applying, by executing at least some first instructions with a processor, a first customer specific encryption method to a data file of a first customer at the centralized storage server to create a customer encrypted data file, the first customer specific encryption method including a first hash function different from a second hash function of a second customer specific encryption method to be applied to a second data file of a second customer;
   deleting, by executing an instruction with the processor, the first customer specific encryption method from the centralized storage server, the deleting of the first customer specific encryption method including deleting the first hash function; and
   after the applying of the first customer specific encryption method to create the customer encrypted data file, applying, by executing an instruction with the processor, a third encryption method, different from the first customer specific encryption method and the second customer specific encryption method, to the customer encrypted data file, the third encryption method being a general encryption method applied to a plurality of data files stored in the centralized storage server, the plurality of data files associated with a plurality of different customers including the first customer.

2. The method of claim 1, further including:
   receiving, at the processor, a request from the first customer to retrieve the data file, wherein the request includes the first instructions to execute the first customer specific encryption method;
   decrypting, by executing an instruction with the processor, the general encryption method applied to the customer encrypted data file;
   decrypting, by executing at least some of the first instructions with the processor, the first customer specific encryption method applied to the data file;
   deleting, by executing an instruction with the processor, the first customer specific encryption method from the centralized storage server; and
   sending, the data file from the processor to the first customer.

3. The method of claim 1, further including:
   sending a request from the processor to the first customer to access the customer encrypted data file;
   receiving, at the processor, the first instructions to execute the first customer specific encryption method from the first customer;
   decrypting, by executing an instruction with the processor, the general encryption method applied to the customer encrypted data file;
   decrypting, by executing at least some of the first instructions with the processor, the first customer specific encryption method applied to the data file;
   accessing, by executing an instruction with the processor, information in the data file;
   applying, by executing at least some of the first instructions with the processor, the first customer specific encryption method to the data file to re-create the customer encrypted data file;
   deleting, by executing an instruction with the processor, the first customer specific encryption method from the centralized storage server; and
   applying, by executing an instruction with the processor, the general encryption method to the customer encrypted data file that was re-created.

4. The method of claim 3, wherein the request to access the customer encrypted data file includes a request to obtain credit card information in the data file for a repeat billing.

5. The method of claim 1, wherein the centralized storage server is maintained by a retailer.

6. The method of claim 1, wherein the centralized storage server is maintained by a cloud storage service provider.

7. The method of claim 1, wherein the first customer specific encryption method is created on an endpoint device of the first customer.

8. The method of claim 1, wherein the general encryption method includes a secure hash algorithm.

9. A tangible computer-readable storage device including a first plurality of computer executable instructions, which when executed by a processor associated with a centralized storage server, causes the processor to perform operations for applying customer specific encryption methods at the centralized storage server, the operations comprising:
   executing at least some second instructions to apply a first customer specific encryption method to a data file of a first customer at the centralized storage server to create a customer encrypted data file, the first customer specific encryption method including a first hash function different from a second hash function of a second customer specific encryption method to be applied to a second data file of a second customer;
   deleting the first customer specific encryption method from the centralized storage server, the deleting of the first customer specific encryption method including deleting the first hash function; and
   after the executing of the at least some of the second instructions to apply the first customer specific encryption method to create the customer encrypted data file, applying a third encryption method, different from the first customer specific encryption method and the second customer specific encryption method, to the customer encrypted data file, the third encryption method being a general encryption method applied to a plurality of data files stored in the centralized storage server, the plurality of data files associated with a plurality of different customers including the first customer.

10. The tangible computer-readable storage device of claim 9, wherein the operations further include:
    receiving a request from the first customer to retrieve the data file, wherein the request includes the second instructions to execute the first customer specific encryption method;
    decrypting the general encryption method applied to the customer encrypted data file;

decrypting the first customer specific encryption method applied to the data file;
deleting the first customer specific encryption method from the centralized storage server; and
sending the data file to the first customer.

11. The tangible computer-readable storage device of claim 9, wherein the operations further include:
sending a request to the first customer to access the customer encrypted data file;
receiving the second instructions for executing the first customer specific encryption method from the first customer;
decrypting the general encryption method applied to the customer encrypted data file;
decrypting the first customer specific encryption method applied to the data file;
accessing information in the data file;
applying the first customer specific encryption method to the data file to re-create the customer encrypted data file;
deleting the first customer specific encryption method from the centralized storage server; and
applying the general encryption method to the customer encrypted data file that was re-created.

12. The tangible computer-readable storage device of claim 11, wherein the request to access the customer encrypted data file includes a request to obtain credit card information in the data file for a repeat billing.

13. The tangible computer-readable storage device of claim 9, wherein the centralized storage server is maintained by a retailer.

14. The tangible computer-readable storage device of claim 9, wherein the centralized storage server is maintained by a cloud storage service provider.

15. The tangible computer-readable storage device of claim 9, wherein the first customer specific encryption method is created on an endpoint device of the first customer.

16. The tangible computer-readable storage device of claim 9, wherein the general encryption method includes a secure hash algorithm.

17. A centralized storage server, comprising:
a processor; and
a computer-readable storage device including a first plurality of computer executable instructions which, when executed by the processor, causes the processor to perform operations, the operations including:
executing at least some second instructions to apply a first customer specific encryption method to a data file of a first customer at the centralized storage server to create a customer encrypted data file, the first customer specific encryption method including a first hash function different from a second hash function of a second customer specific encryption method to be applied to a second data file of a second customer;
deleting the first customer specific encryption method from the centralized storage server, the deleting of the first customer specific encryption method including deleting the first hash function; and
after the executing of the at least some of the second instructions to apply the first customer specific encryption method to create the customer encrypted data file, applying a third encryption method, different from the first customer specific encryption method and the second customer specific encryption method, to the customer encrypted data file, the third encryption method being a general encryption method applied to a plurality of data files stored in the centralized storage server, the plurality of data files associated with a plurality of different customers including the first customer.

18. The apparatus of claim 17, wherein the operations further include:
receiving a request from the first customer to retrieve the data file, wherein the request includes the second instructions to execute the first customer specific encryption method;
decrypting the general encryption method applied to the customer encrypted data file;
decrypting the first customer specific encryption method applied to the data file;
deleting the first customer specific encryption method from the centralized storage server; and
sending the data file to the first customer.

19. The apparatus of claim 17, wherein the operations further include:
sending a request to the first customer to access the customer encrypted data file;
receiving the second instructions to execute the first customer specific encryption method from the first customer;
decrypting the general encryption method applied to the customer encrypted data file;
decrypting the first customer specific encryption method applied to the data file;
accessing information in the data file;
applying the first customer specific encryption method to the data file to re-create the customer encrypted data file;
deleting the first customer specific encryption method from the centralized storage server; and
applying the general encryption method to the customer encrypted data file that was re-created.

20. The apparatus of claim 19, wherein the request to access the customer encrypted data file includes a request to obtain credit card information in the data file for a repeat billing.

* * * * *